United States Patent
Parsadayan et al.

(10) Patent No.: US 7,324,014 B2
(45) Date of Patent: Jan. 29, 2008

(54) INDUCTIVE LOOP DETECTOR WITH AUTOMATIC FREQUENCY CHANGE

(75) Inventors: Walter Parsadayan, Lake Forest, CA (US); Daniel Perez, Foothill Ranch, CA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 1003 days.

(21) Appl. No.: 10/386,968

(22) Filed: Mar. 11, 2003

(65) Prior Publication Data

US 2004/0179466 A1  Sep. 16, 2004

(51) Int. Cl.
*G08G 1/01* (2006.01)
(52) U.S. Cl. ............... 340/933; 340/941; 340/551; 324/200; 324/207.15
(58) Field of Classification Search ......... 340/933, 340/941, 551, 552; 324/200, 207.15
See application file for complete search history.

(56) References Cited

U.S. PATENT DOCUMENTS 3,943,339 A * 3/1976 Koerner et al. ............. 377/9
6,380,868 B1 4/2002 Hilliard et al.
7,132,959 B2 * 11/2006 Seabury et al. ............. 340/933

FOREIGN PATENT DOCUMENTS

| EP | 0 419 273 A2 | 3/1991 |
| GB | 2 138 613 A | 10/1984 |
| GB | 2 149 952 A | 6/1985 |
| JP | 04346088 A * | 12/1992 |

OTHER PUBLICATIONS

English Abstract for Japanese Patent JP60064287A, Apr. 12, 1985.
British Search Report for British Patent Application No. GB0405297.3 dated Jul. 26, 2004.

* cited by examiner

*Primary Examiner*—Benjamin C. Lee
*Assistant Examiner*—Travis R. Hunnings
(74) *Attorney, Agent, or Firm*—Fitch, Even, Tabin & Flannery

(57) ABSTRACT

A system and method is disclosed to the elimination of cross talk between inductive loop detector units in a security system. The system includes appropriate devices for assigning different operational frequencies of each loop detector circuit to avoid cross talk. In a further aspect it provides a system and method for determining actual operational frequencies of various loop detector circuits in a security system and for changing the resonant frequencies to eliminate cross talk.

8 Claims, 12 Drawing Sheets

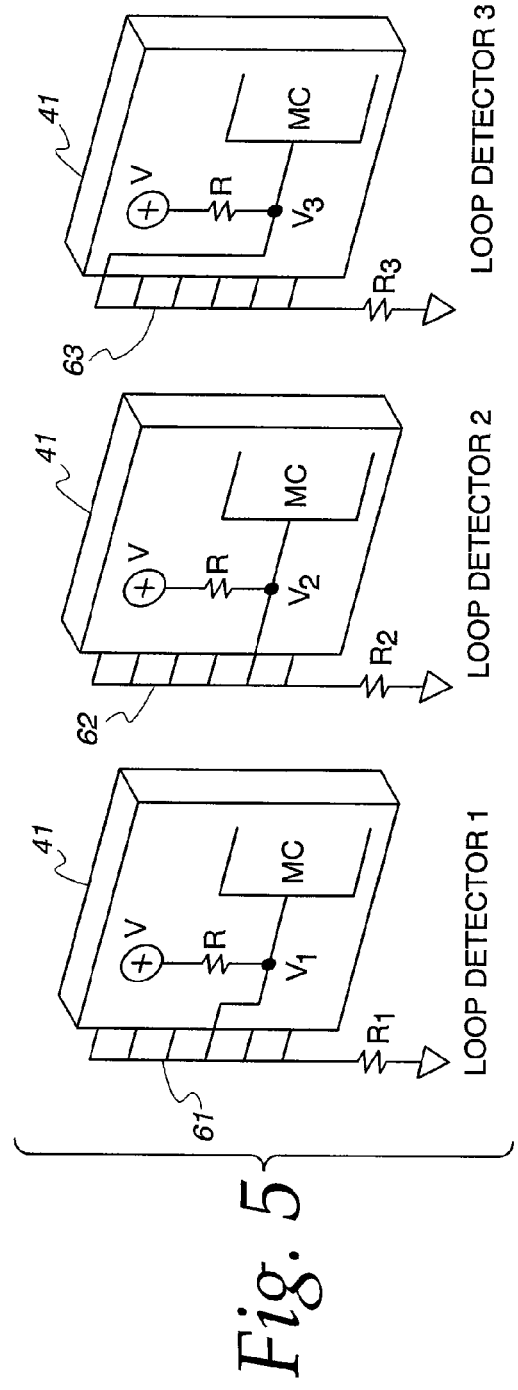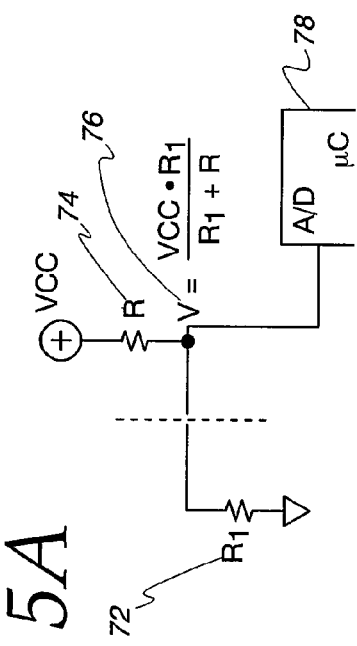
Fig. 5
Fig. 5A

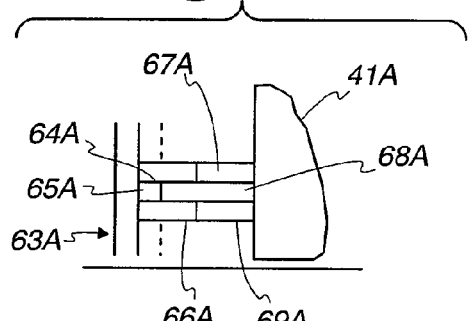
Fig. 5B
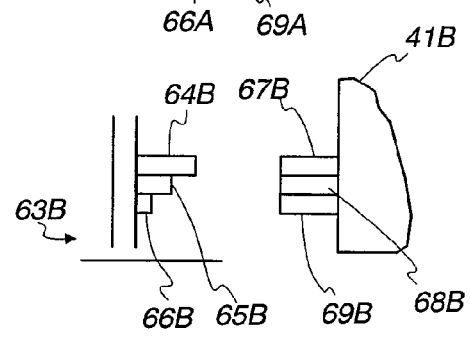
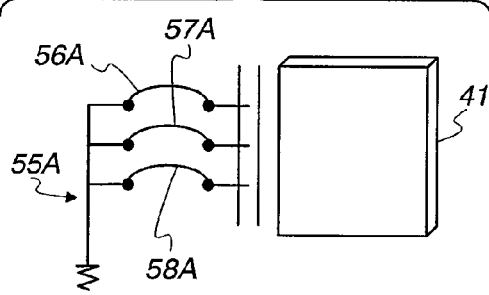
Fig. 5C
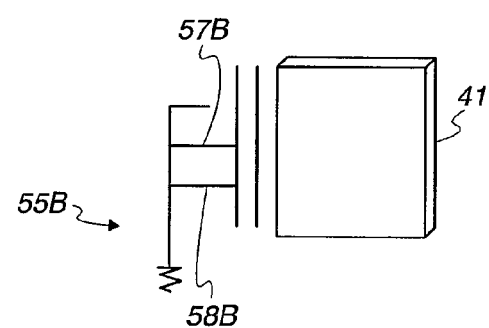
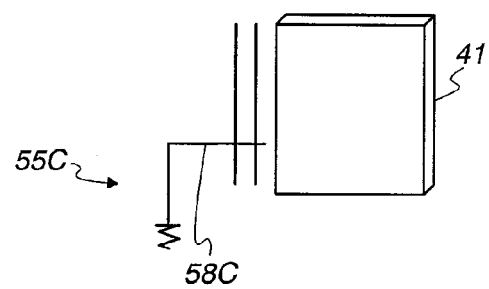

INDUCTIVE LOOP DETECTOR WITH AUTOMATIC FREQUENCY CHANGE

FIELD OF THE INVENTION

The present invention relates to loop detectors used to detect the presence of a vehicle within the operational area of a security gate and more particularly a system and method for eliminating cross-talk among loop detectors located within the operational area of the loop detector.

BACKGROUND OF THE INVENTION

Loop detectors are used to detect the presence of large metal objects within a specific area. One example of a loop detector system consists of inductive loops connected to appropriate circuitry that generate a signal in the inductive loop at a set frequency which in turn creates a magnetic field in the vicinity of the inductive loop. When a large metal object comes within the range of the magnetic field generated by the inductive loop this causes a change in the inductance of the loop that in turn causes a change in the frequency in the inductive loop. This change in the frequency signals the presence of the metal object.

Inductive loops are used to detect the presence and movement of vehicles along a roadway by imbedding the loops in the pavement or asphalt of the roadway. Inductive loop systems are also used to detect the presence of vehicles within the operational area of a security gate. However problems develop when two or more independent inductive loops are placed near by each other and the operational frequency of the adjacent inductive Loops is the same in each loop, magnetic fields generated by each the loops can interfere with each other. This interference can cause false detections, i.e. an indication a vehicle is present when one is not, or false drops, i. e. an indication a vehicle has left the detection area when it has not, etc.

FIG. 1 provides a view of a sliding security gate 23 with two safety loops 25 and 27 used to detect the presence of a vehicle adjacent to either side of the gate or passing through the gate. FIG. 2 provide a view of a swinging security gate 33 and the safety loops 35 and 37 as well as the center loop 39 used to detect the presence of a vehicle adjacent to either side of the gate, within the movement area of the gate or passing through the gate. In both FIGS. 1 and 2 the loops are so close together that each will have a tendency to interfere with the operation of the other if they are operating at the same frequency.

To avoid the problem of interference between loop detectors one of the standard solutions has been to provide loop detectors with multiple selectable frequencies on which the installer has to make changes manually. This solution has its deficiencies since the technician installing the loop detector will have to check the frequency of the loop detectors with a fairly expensive instrument. Checking the frequency in this manner is time consuming. Also, the person installing the system may forget to select different operational frequencies for adjacent loop detectors or make incorrect assumptions. Another alternative is providing loop detectors that display the frequency at which the loop is operating and allow for the programming of a frequency by the technician on installation of the system. Other solutions that have been used is to not have each loop detector circuit operate continuously but rather scan at a preset time interval timed such that each loop detector circuit scans different times so that none are scanning at the same time.

Thus, what is needed is a system and method for preventing cross talk between the inductive loops of adjacent loop detection circuits. A system and method that can automatically detect if two adjacent loops have the same operational frequency and set the oscillatory frequency of each loop detection unit to a different frequency that will result in a non conflicting working frequency between them. Such a system must be simple cost effective and easy to install in new systems as well as retrofit on to existing systems.

SUMMARY

It is thus an objective of the present invention to provide a loop detection system that prevents cross talk between loops of adjacent loop detection circuits. It is a further objective to provide a system and method that is economical to fabricate and install. It is a further objective to provide a system that can automatically detect a conflict between the operational frequencies of a adjacent loop detectors and automatically change the frequencies to avoid cross talk.

These and other objectives of the present invention are accomplished by providing a system for eliminating cross talk between loop detectors in a security system, said system having: a) at least two inductive loops positioned adjacent to a movable barrier to detect the presence of objects adjacent to the barrier; b.) each of said at least two inductive loops being connected to a separate loop detector circuit to thereby form at least two loop detectors; c) a device for automatically selecting a unique frequency each of said at least two loop detectors will function at so each of said two loop detectors will be functioning at a different frequency to thereby avoid cross talk between each of said at least two loop detectors.

In a further aspect of the present invention it provides a system that includes three or more loop detectors each of which has a unique automatically selected frequency to function at to thereby avoid cross talk.

In yet another aspect of the system of the invention setting of the unique frequency at which each of the loop detectors will function at includes circuitry connected to each slot that each of the loop detectors will be connected to that automatically sets a pre-selected unique frequency at which each of the loop detectors will function.

In a further aspect of the invention the means by which the unique frequency that each of the loop detectors will function at is set by a CPU operatively connected to each loop detectors that can sense the frequency each of loop detector are functioning and at if the loop detectors are functioning at a frequency that would create cross talk among each among the CPU will change the frequency that each of the loop detectors are functioning at to thereby avoid cross talk among the loop detectors.

BRIEF DESCRIPTION OF THE DRAWINGS

The invention will be better understood by an examination of the following description, together with the accompanying drawings, in which:

FIG. 5 a schematic diagram of various loop detector units at varying addresses;

FIG. 5A is a block diagram of a simple circuit used to determine address for each loop detector unit;

FIG. 5B is a schematic block type diagram of a mechanical apparatus to set selected frequencies of operation;

FIG. 5C is a schematic block type diagram of another way to preset resonant frequencies;

DETAILED DESCRIPTION OF THE PREFERRED EMBODIMENT

The following is a description of selected preferred embodiments of the loop detection system of the present invention. While a preferred embodiment is being disclosed those of ordinary skill in the art once they have reviewed this specification and understand the principals of the invention will see its application is not limited to the preferred embodiments disclosed.

Figure 1:
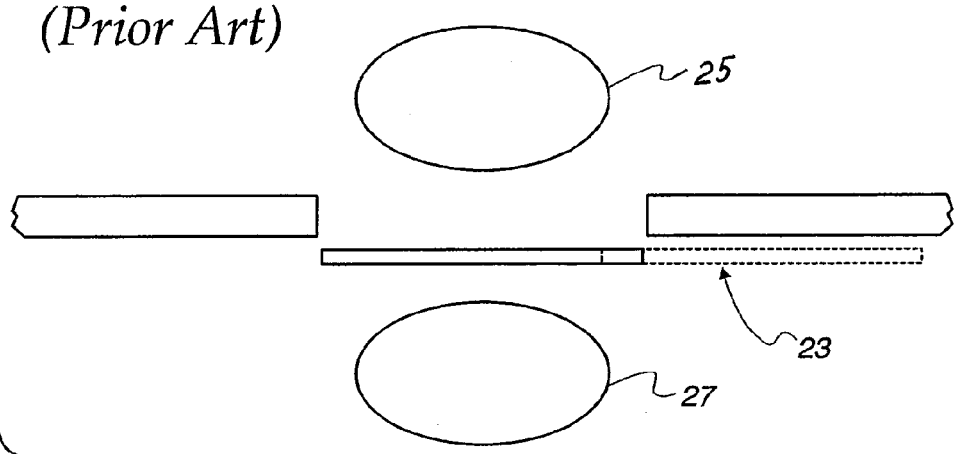
FIG. 1 schematic diagram of a sliding gate system with loop detector.
Figure 2:
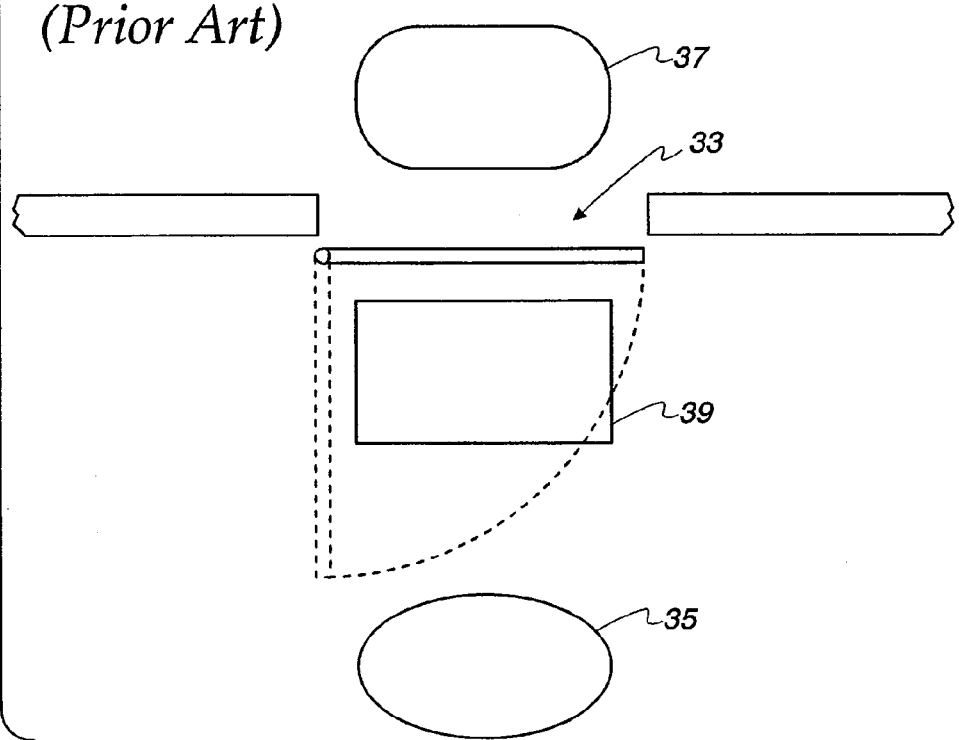
FIG. 2 schematic diagram of a swinging gate system with loop detector.
Figure 3:
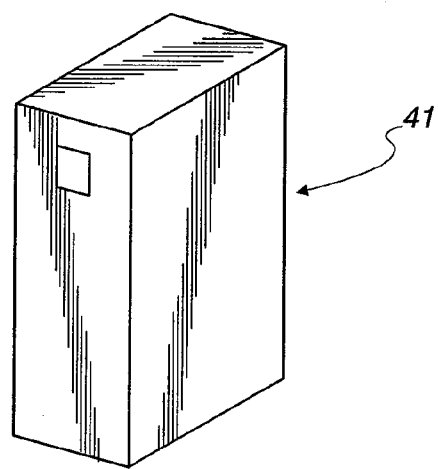
FIG. 3 a perspective view of a modular housing holding loop detection circuitry.
Figure 4:
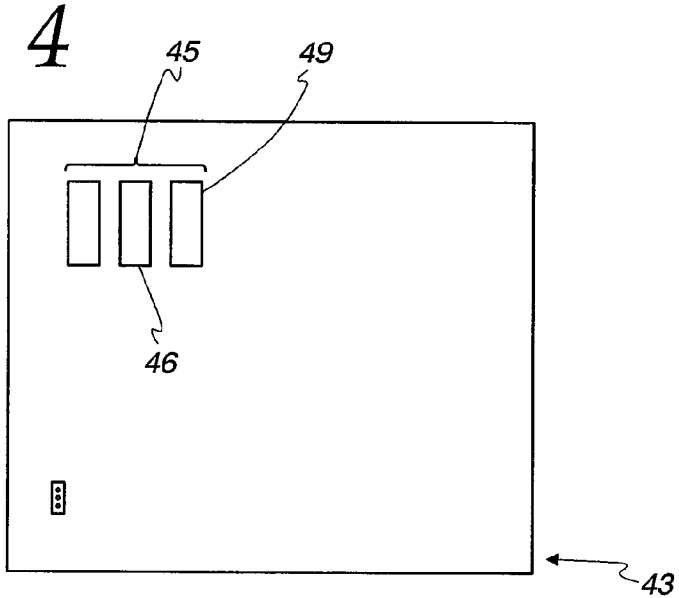
FIG. 4 a schematic block type diagram of a gate controller board.

As noted above, the typical loop detector devices of a security gate system use inductive loops positioned in the roadway as depicted in FIGS. 1 and 2 to detect the presence of movement of vehicles in and through the security gate area. The inductive loops depicted in FIGS. 1 and 2 are each connected to their own loop detection circuits that are usually located on the gate controller board of the security gate system. In the preferred embodiment of the invention, for efficiency and ease in replacing the loop detector circuits and servicing them, the loop detection circuits are housed in individual modular units 41 (FIG. 3) that can be easily inserted into and removed from assigned slots 45 (FIG. 4) on gate controller board 43. In the preferred embodiment, the circuitry in each modular loop detection circuitry unit 41 is virtually the same so units 41 are interchangeable. In the preferred embodiment of the invention each slot 45 on controller board 43 is for one of the inductive loops of the security gate setup. Also, board 43 is typically designed to function with more than one type of security gate setup, so board 43 may be able to function with a sliding gate system FIG. 1 or a swinging gate system FIG. 2 or other type of gate controller. Thus, a modular unit 41 placed in slot 46 would function with safety loop 25 (FIG. 1) or safety loop 37 (FIG. 2) while a modular unit 41 inserted into slot 49 would work with safety loop 27 (FIG. 1) or safety loop 35 (FIG. 2), depending on the installation. A modular unit 41 placed in slot 47 would work with center loop 39 of swing gate 33 FIG. 2. Sliding gate 23 of FIG. 1 does not have a center loop, and therefore any unit inserted in slot 47 at a sliding gate facility would be non-functional. Unit 41 has the basic systems disclosed in FIG. 3A. A detailed discussion of the circuitry inside unit 41 with drawings is not provided since these types of systems are well known to those of ordinary skilled in the art.

In one version of the present invention the frequency of each loop detector assigned is based on the address of the slot in which the modular circuitry housing 41 is installed. Slots 46, 47, and 49 each having a different address. When modular unit 41 is inserted into one of the slots of board 43, the frequency at which the loop detector functions would be automatically preset based on the slots address. The frequency at which modular unit 41 operates at can be set in a number of different ways. Modular Unit 41 can include internal circuitry and components that upon insertion of Unit 41 into the slot determines the address of the slot, i.e. the slot for one of the safety loops or the center loop. Upon determination of the address of the slot, unit 41 then sets the operational frequency of the loop detector, based on the frequency assigned to that slot. Loop detectors of the nature discussed above typically operate at a range of 40-60 khz; however, the range can be extended if desired. In order to obtain a sufficient frequency separation between the frequencies at which the loop detectors operate; the frequencies are usually set at least 5 khz apart, although smaller or larger separations can be used. Alternatively, the separation can be set as a percentage difference, 5 percent frequency separation is one used but other percentage differences are possible. A typical modular unit 41 might have about three different selectable frequencies at which it could operate. However, for some applications the unit could have more than four selectable frequencies or less than four. When discussing setting of frequencies herein we are referring to the setting the resonant frequencies at which each loop detector circuitry will operate. Actual operational frequencies at which the loop detectors will operate depend on size of the loop, number of turns, etc. as will be discussed in detail below.

FIG. 5B is a schematic block type diagram that depicts a mechanical means for setting different resonant frequencies in each of the loop detector circuits. Each slot 63A, 63B and 63C will have projections 64, 65, and 66 that mate with switches 67, 68 and 69 on the end of loop circuit unit 41 that is inserted into the slot. 64, 65 and 66 are fixed and immovable while 67, 68 and 69 have at least three different setting depending on how far in they are depressed. A portion of unit 41A can be seen in which projections 64A, 65A and 66A have mated with switches 67A, 68A and 69A. Unit 41B has not been inserted in slot 63B so projects 64B, 65B and 66B as well as switches 67B, 68B and 69B can be seen prior to 41B's being plugged into the slot. Projections 64C, 65C and 66C in slot 63C as can be seen differ in configuration from those in slot 63A and 63B. Switches 67, 68 and 69 on each unit are not shown in full detail since they are standard switches that respond to being depressed and connect to the circuitry in unit 41 to select a predetermined frequency. FIG. 5C is a schematic block type diagram that shows how electrical contact traces 56, 57 and 58 in each of the slots 55A, 55B and 55C can be used to activate resonant frequency selection circuitry in each unit 41. Slot 55A has three contact traces 56A, 57A and 58A. Slot 55B has two 57B and 57C while slot 55C has one 58C. Depending on the number of traces a specific pre-selected resonant frequency is selected for each Unit 41 depending on the slot 55A, 55B or 55C in which it is positioned.

FIG. 5 a schematic diagram depicts a way for assigning an address to each of the slots that an inductive loop detector is associated with. FIG. 5 provides 3 different loop detector address, for instance; Loop 1 may be for the first safety loop, Loop 2 for the center loop, and Loop 3 for the second safety loop. Modular Units 41 would connect to electrical connectors 61, 62 or 63 located in each of the slots. The circuitry of the connector would include a resistor of a pre-selected value in the main control board, for instance, Loop 1 would have resistor R1, Loop 2 would have resistor R2, Loop 3 would have resistor R3. The value of each resistor would be different with perhaps R1 having the largest resistance, R2 the middle resistance and R3, having the least resistance. This is only one example the resistances can be varied in any fashion with the only requirement being that R1, R2 and R3 all are set at different resistances. By varying the resistance in this fashion the voltage drop each unit 41 sees in each loop would vary. Based on this variation of voltage, unit 41 then could, with the appropriate circuitry, make a determination as to which slot it has been placed in and thus at which frequency it should be preset at to operate. FIG. 5A provides is a simple block diagram of the circuitry that each unit includes to provide the requisite address. Resistor $R_1$ 72 is located on the main circuit board, dotted line 74 showing the demarcation between components on the main circuit board and unit 41. Resistor R 74 and A/D micro controller 76 are located in unit 41. In the circuit depicted in FIG. 5A the system determines the address by the voltage V value at point 76. The values are determined by a well-known relationship $(V=V_{cc} \cdot R_1/R_1+R)$ where $V_{cc}$ a preset voltage that each unit 41 is set at, R is a standard resistance, which is the same for each unit, and $R_1$ is the variable preset resistance for each slot. $R_1$ as noted above $R_1$ is different value for each slot 25 on the main circuit board 43.

Figure 6:
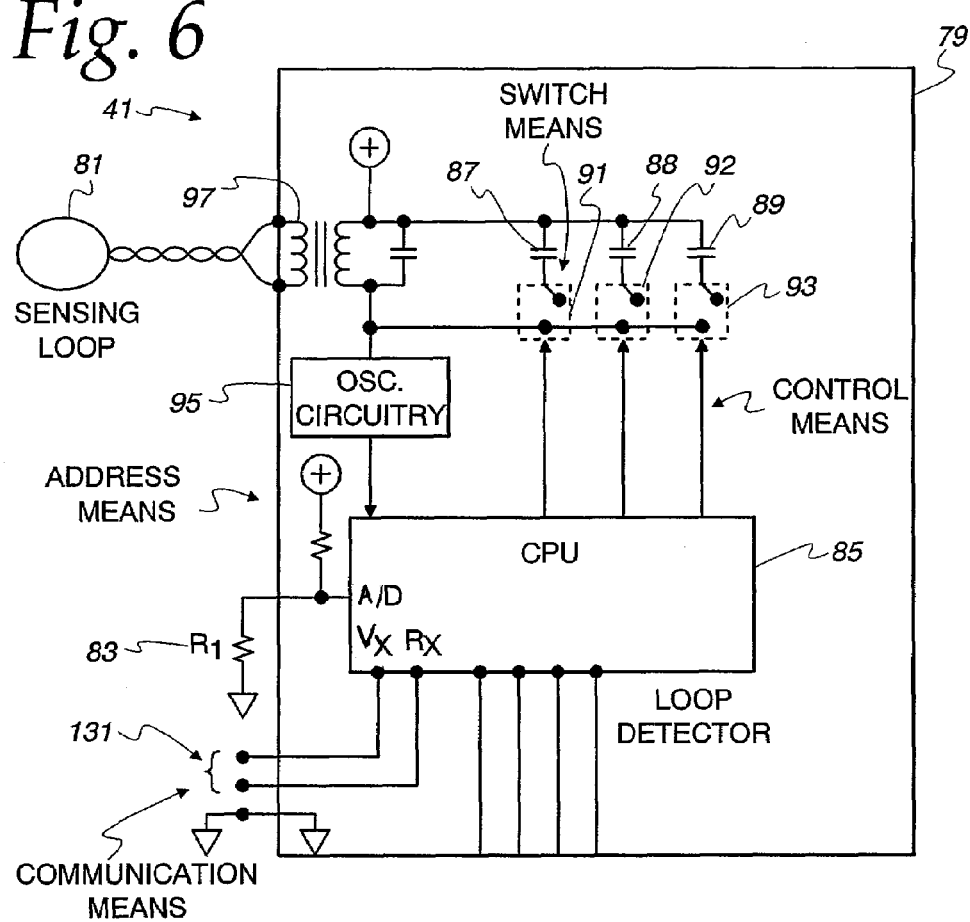
FIG. 6 a schematic diagram of some of the basic circuitry used to set frequency of a modular loop detector circuitry unit.

FIG. 6 provides a schematic diagram of the circuitry in Unit 41 that would enable unit 41 to determine the address at which Unit 41 is located and allow it to set to the appropriate frequency. The circuitry within Unit 41 is contained in rectangle 79. Unit 41 connects to a inductive loop 81 through transformer 97. When Unit 41 is connected to a slot it would naturally be connected to the resister 83 in this case, R1, that would provide a means of identification of the address as noted above. In the version depicted in FIG. 6 CPU 85 located within Unit 41 would sense the address based on the voltage created, as noted above. Based on this the CPU 85 would activate one or more capacitors 87, 88,or 89. Switches 91, 92, or 93 would activate capacitors 87,88, and/or 89, the switches are controlled by CPU 85. Depending upon whether none of the capacitors are activated, or they are activated in a specific sequence the activation or non-activation of capacitors 87,88, or 89 would set the frequency at which the oscillatory circuitry 95 functions. The connection between the oscillatory circuitry 95, and Loop 81 is through an appropriate transformer 97. It should be noted that FIG. 6 shows a very basic schematic diagram of the circuitry used to set and adjust the frequency of operation. FIG. 6 does not show any of the other circuitry that would analyze the change of frequency caused by the movement of a vehicle through the detection area or the circuitry used to detect temperature variations, and prevent them from affecting the operation of the system.

In other alternative method for overcoming the problem described the setting the operational frequency of each of the loop detector units to avoid cross take can be set in a variety of other different ways. In one variation a communicative link between a central control unit and a local gate system can be established, and the frequencies for each loop detector unit assigned from the remote central control unit. In another variation to be explained in more detail below in one embodiment a communication link is established between each of the units and the unit between themselves determine if the frequencies are the same and assign different none conflicting frequencies between themselves. In another variation a CPU the main circuit board of the gate controller running an appropriate routine can determine operating frequencies and assign non-conflicting frequencies.

Figure 7:
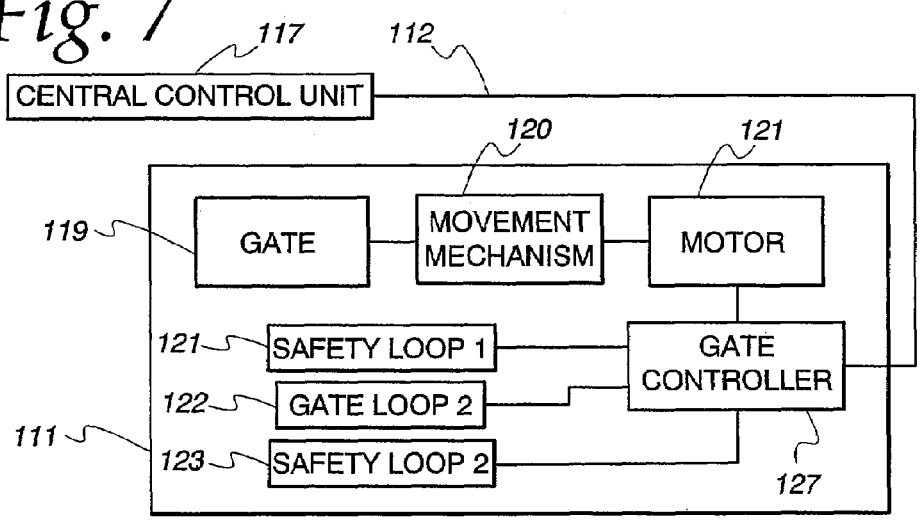
FIG. 7 a schematic block diagram of a central control unit in a communicative link with a local security gate system employing the present invention.

FIG. 7 provides a block diagram of a setup whereby a remote central control unit 117 would assign operational frequencies. In FIG. 7, the Local Security Gate System 111, is connected by communicative link 112, with a Central Control Unit 117. Link 112 could be a connection through the public telephone system, or a separate hardwire connection, or it could be a radio frequency connection. Typically, a remote central control unit that could control several local security gate systems. The local security gate system 111, at a minimum would have a Gate 119, a gearing mechanism 120 to transfer power from a motor to the gate to move gate 119, between an open and closed position, and gate motor 121. Additionally the system would have inductive loops 121, 122, and 123, if this were a swinging gate installation. On the other hand if it was a sliding gate installation it would most likely only have a safety loops 121, and 123. The loops would connect to the gate controller, and ultimately to the loop detector circuitry that would be located in Unit 41. Units 41 are located, as mentioned above, in Gate controller 127. Referring to FIG. 6, the communicative link between the central control unit and Unit 141 is shown at 131 where it terminates at Unit 41. Appropriate signals sent from the central control unit 117 would then reach the CPU 85, and CPU 85 would activate the appropriate switches 91,92, or 93, to set the appropriate frequency.

Figure 8:
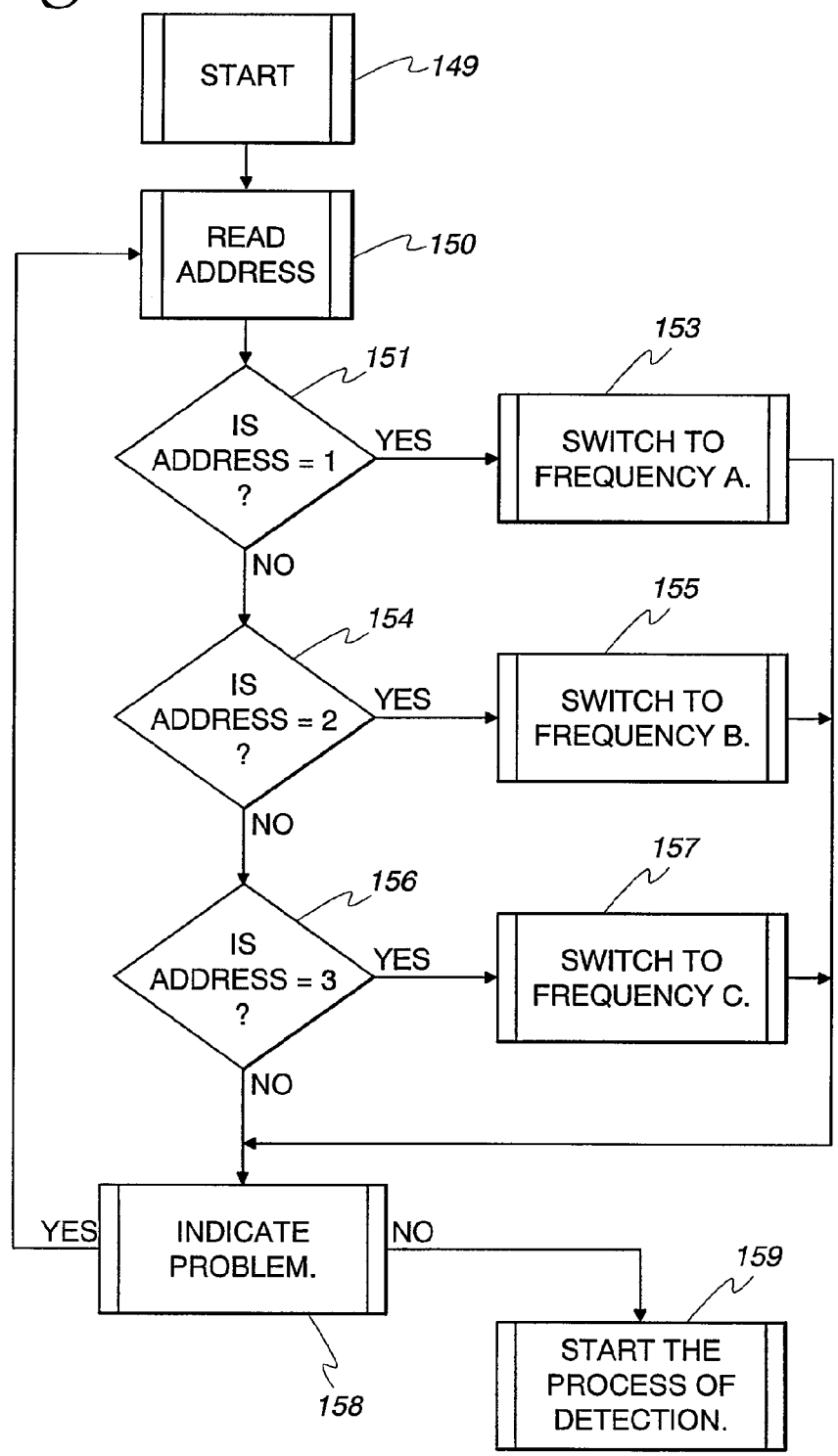
FIG. 8 is a flow chart of one operational method of the present invention with at least two loop detectors.

FIG. 8 provides a flowchart of one operational method of a system that has at least two loops and the detection loops are approximately the same circumference and same windings. The modular units 41 (FIG. 3) and that contain the loop detection circuitry and all the other associated circuitry with which the loop detector operate are first inserted into the appropriate slots the system on controller circuit board 43 (FIG. 4) will be turned on 149. Upon turning on the system, the read address command 150 will direct the system to read the address 151 of position One, each slot 47, 46 and 49 (FIG. 4) having an assigned position or address, i.e. One, Two and Three. If the system determines that there is a modular unit at position One, it will turn it on at frequency A 153. Naturally, if at 151 it determines that there is no modular unit at position one it would so note and it move on to check the address at position two 154. The system then proceeds to read the address 154 of position Two. If the system determines that, in fact, there is a modular unit at position Two it would switch the system to frequency B 155. If on checking for a modular loop detector unit at position Two it determined that none was there it would move on to check for a unit at position three 156. If the system determined there was a unit at position Three 156 it would then switch the system to frequency C 157. Upon setting the unit at position three at frequency C, 157, the system would then make a determination as to whether there is any problem 158. If there are no problems the system would then start the process of detection 159. However, if in checking for problems 158, it determines there appears to be some problems the system would rerun the entire routine to ensure that everything is in correct working order. Naturally, if it determines upon checking position Three 156 that there is no unit it would make a determination as to whether the system appears to fully functional 158, and start the detection process, if there is no problem159, or rerun the entire routine by going back to re-check each address.

The above-described operational system assumes that each detection loop has the same or pre-assigned conference and turnings. However, if the circumference of each loop and/or the turnings of each loop vary there could be operational problems with the above system. Namely, the actual working frequency of each loop may vary depending of circumference and number of turnings. Conceivably then, if close attention is not paid to the appropriate circumference and turnings the actual operational frequency of two turning loops could be the same even though the system, as described above, has set the indicated functioning frequency that is different.

In a standard loop detector setup the operational frequency of each loop detector circuit, can be determined by making the detection loops the same size and number of turns, using transformers using the same ratios and controlling the other aspects of the circuitry. Changes in ambient temperature will have a like effect on all the loop detector circuits and as long as the parts of the circuits used to compensate for these ambient temperature changes are the same for each detection circuit, there should be no problem. However, problems can easily develop if the loops vary in respect to circumference and or number of turns. In some instances, the actual particular installation may require detection loops of different sizes due to layout and size of the gate, roadway, etc. In some instances, the loops may, through human error may be different sizes when installed.

Figure 9:
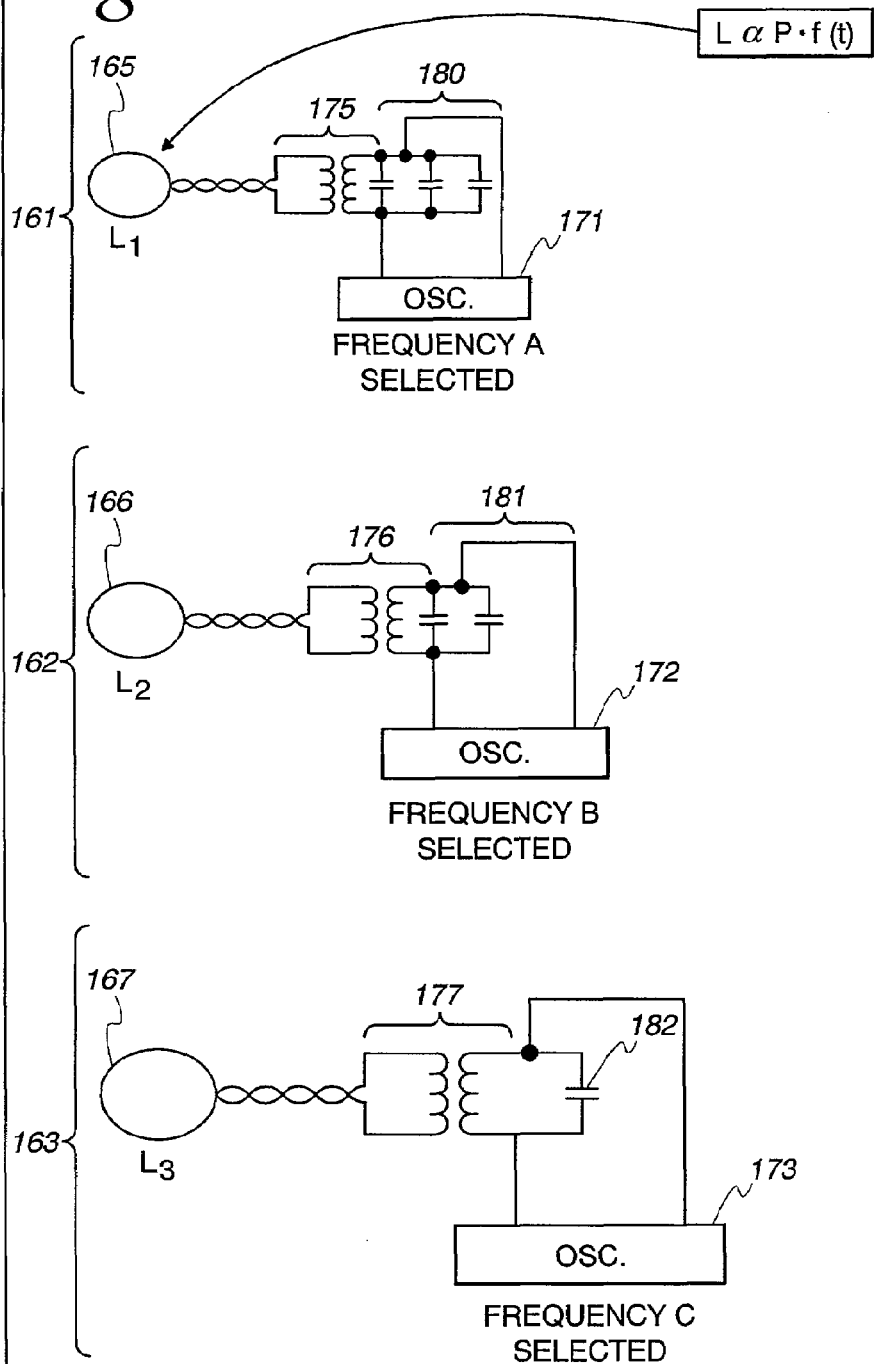
FIG. 9 is a schematic diagram depicting a system with loops of varying dimensions.

FIG. 9 provides a schematic diagram that illustrates the problems that may arise if the loops are of varying circumference and number of turnings. In FIG. 9 each loop detection circuit 161, 162, 163 is of a different size. Each circuit has an oscillator 171, 172, 173 set to a different frequency. Each circuit has a connecting transformer 175, 176, and 177, in the preferred embodiment each transformer would all have the same ratios. Additionally each unit would have one, two, or three capacitors180, 181, 182 as one means of signify its address. Although each oscillator 171, 172, 173 are each set to a different frequency, the actual operational or working frequency of each loop detector unit will be dependant on the geometrical dimensions of the loop, namely it's circumference or perimeter and number of turnings. This relationship can be signified by the varying inductance L, of each loop which is proportional to the circumference of the loop and the number of turns of the loop, i.e. L$\alpha$P·f(n)·l. In this relationship P is the perimeter or circumference of the loop, l the inductance of the resonator and f(n) a function dependent on the turns of the loop. Thus, although all the oscillators may be preset to different frequencies to avoid cross talk, due to the loops being of various sizes, the actual working frequency may be different than was originally anticipated. In such a situation the actual working frequencies could possibly be the same for adjacent loops. The actual frequency that each detection loop wilt function at can be determined by the following equation:

$$F = K \frac{1}{2\pi\sqrt{LC}}$$

In the above equation, F is the operational frequency, K is proportional constant, L is the inductance presented to the resonator circuitry and C is the capacitance of the resonator.

Figure 10:
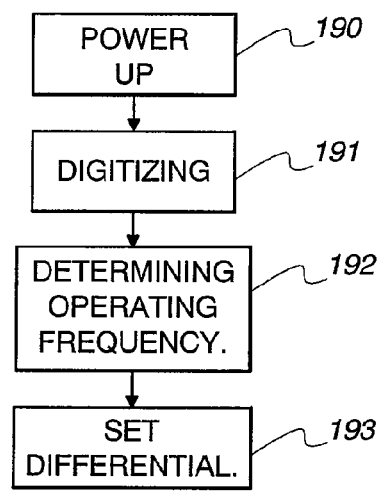
FIG. 10 is a flow chart of a system controlled by a CPU.
Figure 11A:
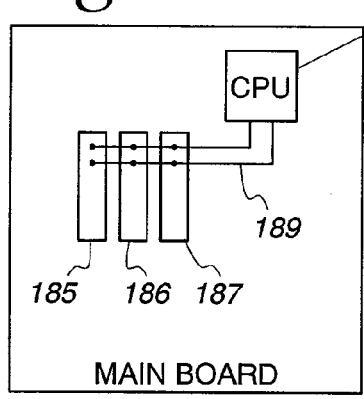
FIGS. 11A and 11B are a simple schematic block type diagrams of CPU controlled system.
Figure 11B:
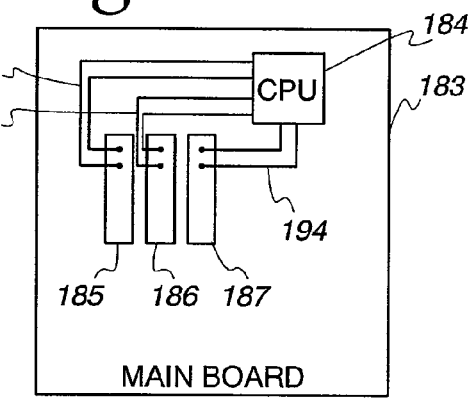

To provide a means for avoiding this potential problem, a second embodiment of the invention is disclosed. FIG. 10 provides a flowchart of the preferred embodiment of the invention to avoid the above-described problem. Upon powering up of the system 190, the system runs an initialization of each unit 191. As noted above, the appropriate resistive values, switches, random numbers, or sequential numbers can indicate the address of each unit. Upon determining the address of each, the system would then determine the operational frequencies of each loop detection circuitry; the system would then set a different operational frequency 193 for each loop detector. In this model most likely, the CPU in the gate controller would be running the routine. Additionally, in the preferred embodiment, the CPU would have a multiple of various oscillatory frequencies it could preset each at to avoid cross talk and not just three frequencies. By running the appropriate program it could determine which oscillatory frequency it should set each unit at in order to avoid cross talk. FIG. 11A provides a simple schematic of one way a CPU 184 would connect to the modular units. In FIG. 11A CPU 184 on board 183 would connect by bus 189 to the three modular loop detection circuitry units 185, 186, 187. Alternatively, as depicted in FIG. 11B CPU 184 on board 183 connects to the various modular loop detection circuitry units 185, 186, 187 by use of separate lines 194, 195, 196.

Figure 11C:
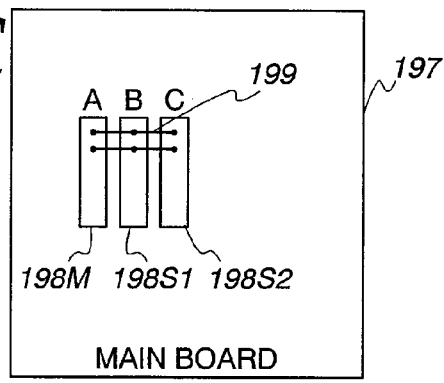
FIG. 11c is a schematic block type diagram of a system controlled by a master unit.

In another variation of the invention, the system would designate one of the loop detection circuits as a master circuit; the other two units would be designated as the slave circuits. The status of each unit could be determined by its position, for example position one could be where the master loop detection circuit would reside. Each of the modular units would be connected for communication between each. In FIG. 11C, unit 198M because of its position is designated a master unit, whereas the other two units with positions of B, and C would be 198S1 and 198S2 would be designated the slave units. Accordingly the master unit would take the lead in determining, and assigning frequencies. In the preferred embodiment, the circuitry in each modular loop detection circuitry unit would be the same. They would each have their own appropriate circuitry in order to allow them to determine their position and thus whether they are the master or the slave units. The operation of such a system, would be described herein and after.

Figure 12:
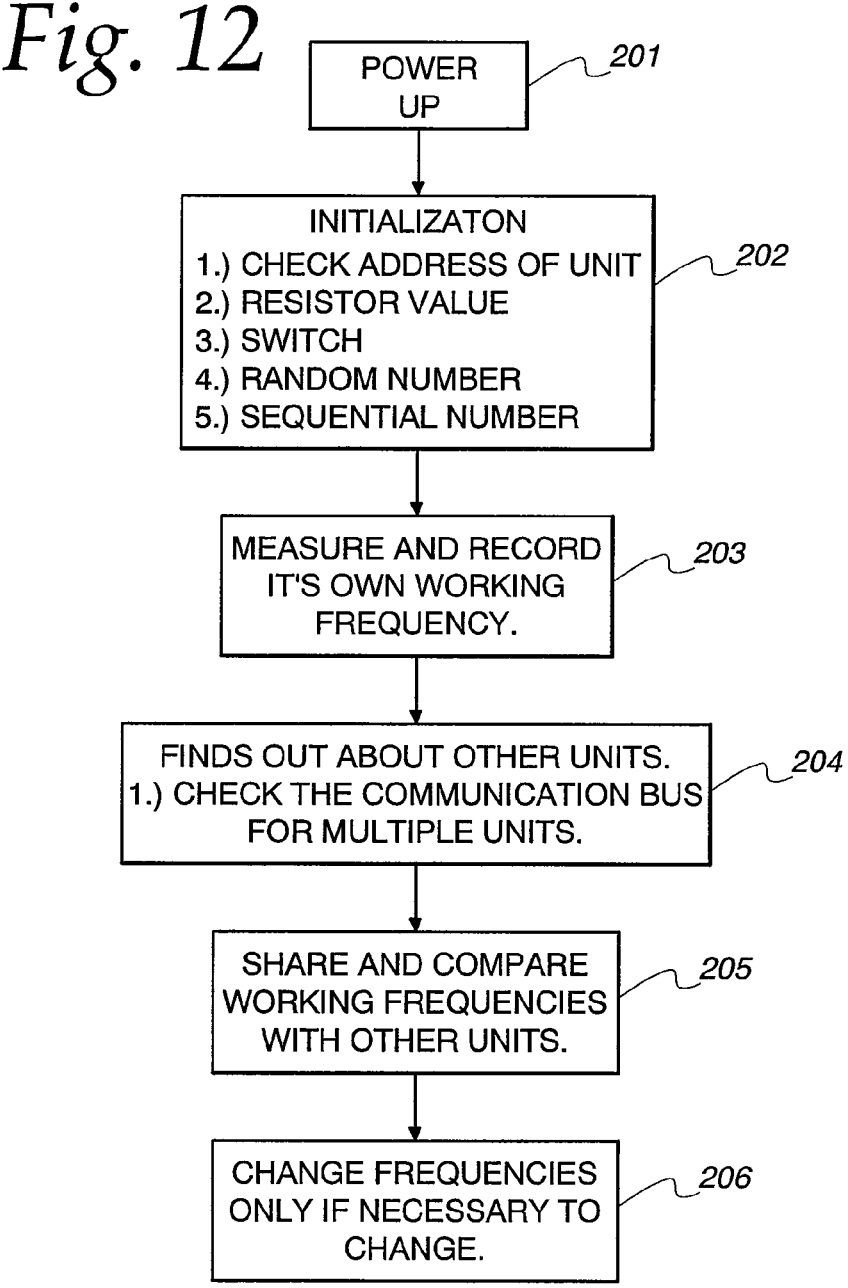
FIG. 12 is flow chart of an overall operational method of a preferred embodiment of the system controlled by a master unit.

FIG. 12 provides an overall flowchart as to how such a system would work. The system would initially power up 201. Upon powering up it would be initialized, and each unit would be assigned their addresses as indicated by either resistors, or switches or other devices as noted above 202. The Master unit that would measure and record it's own working frequency 203, the master unit would then open communication with the other units 204. Such communications could be over a standard communications bus. The master unit checks the communication bus for multiple units 204 and would then query the slave units, which would then communicate to the master unit their respective working frequencies 205. The master unit then would make a determination as to whether or not there is a possible problem of cross-talk, if not, 206 it would not change the frequency that each unit is set at. However if it determined that there was a possible problem of cross talk, then it would make a reassignment of oscillatory frequencies for each unit to avoid the possible cross talk.

Figure 13:
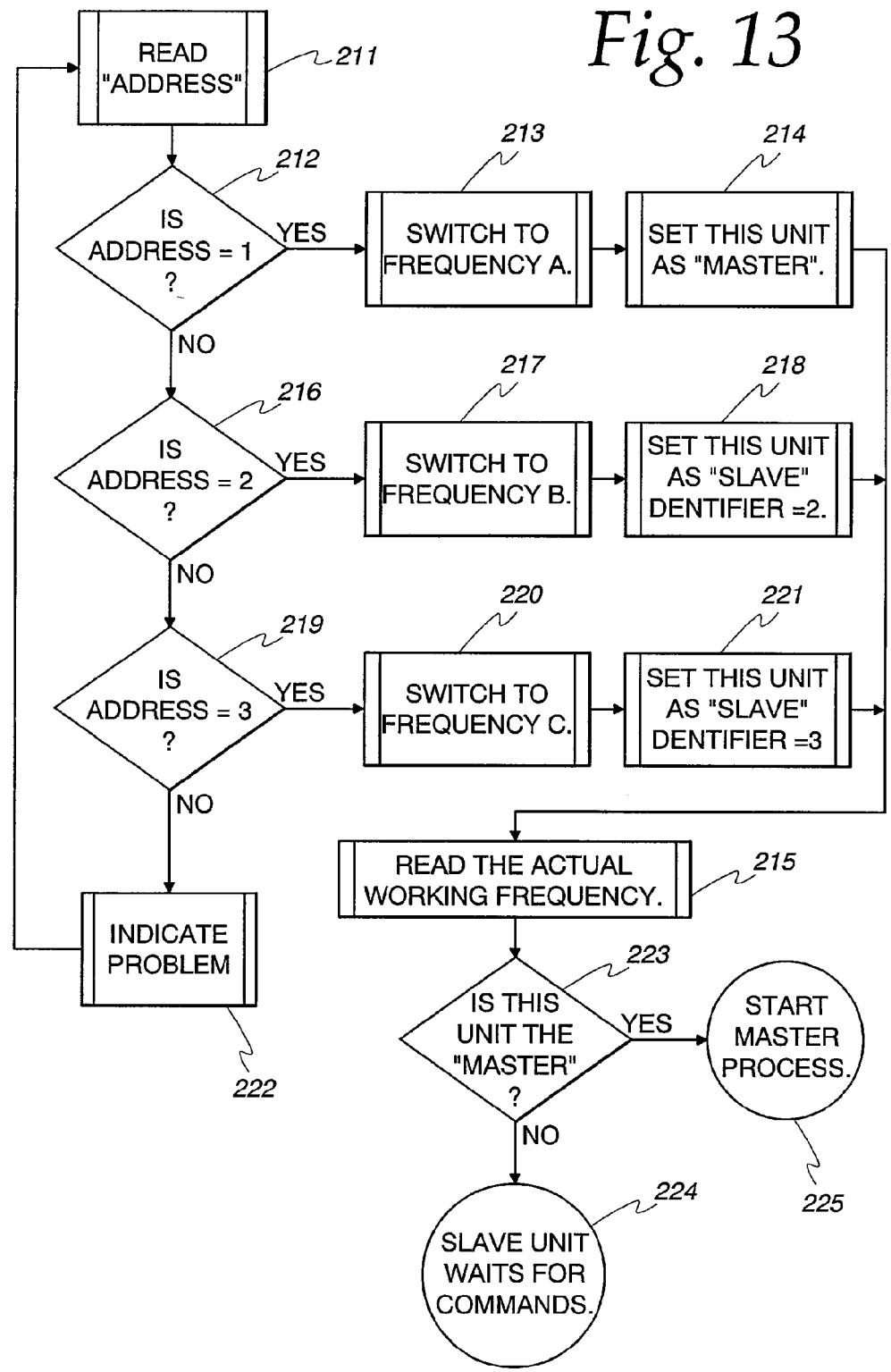
FIGS. 13, 14 and 15 are detailed subroutines of the method depicted in FIG. 12.
Figure 14:
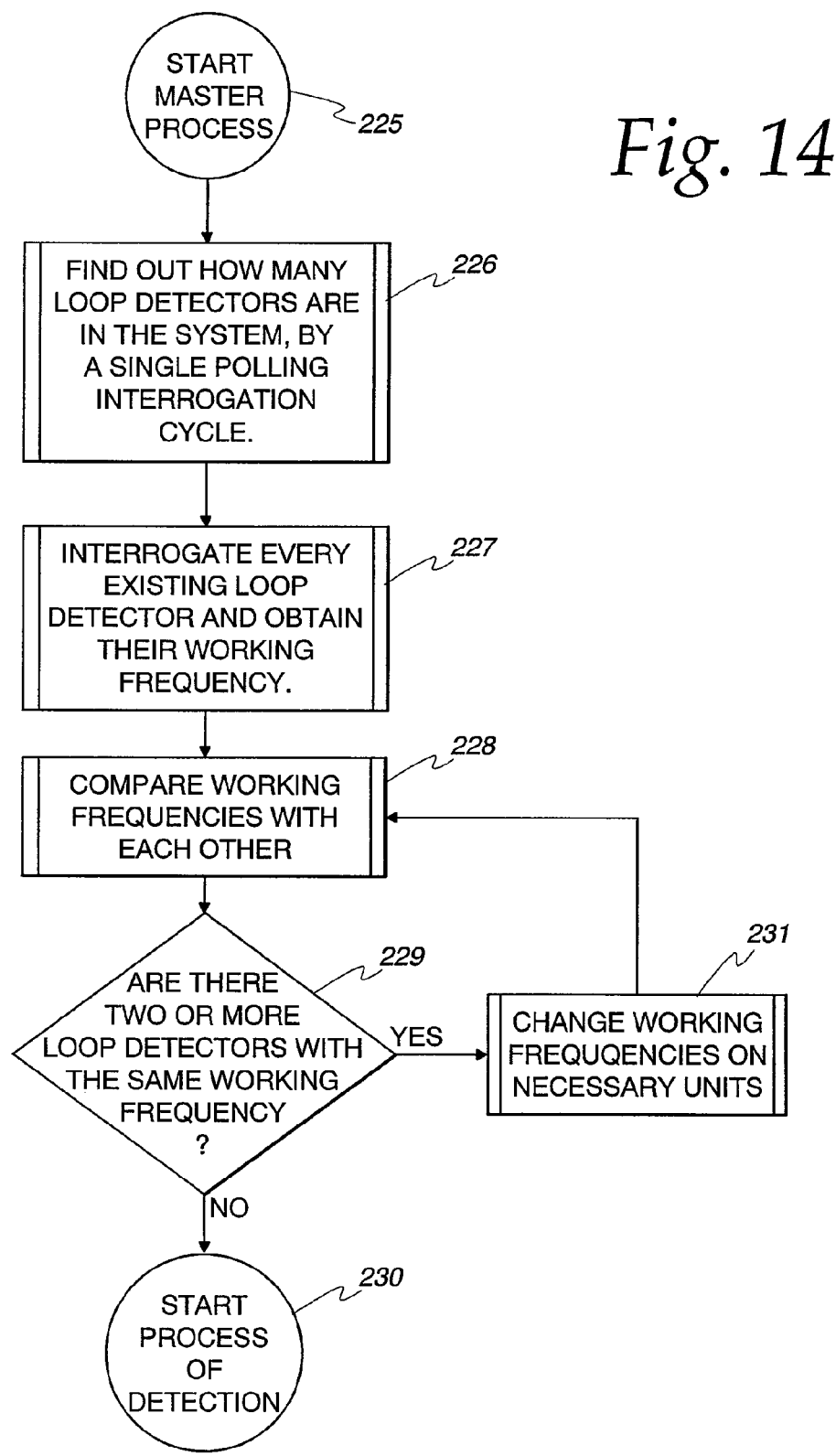
Figure 15:
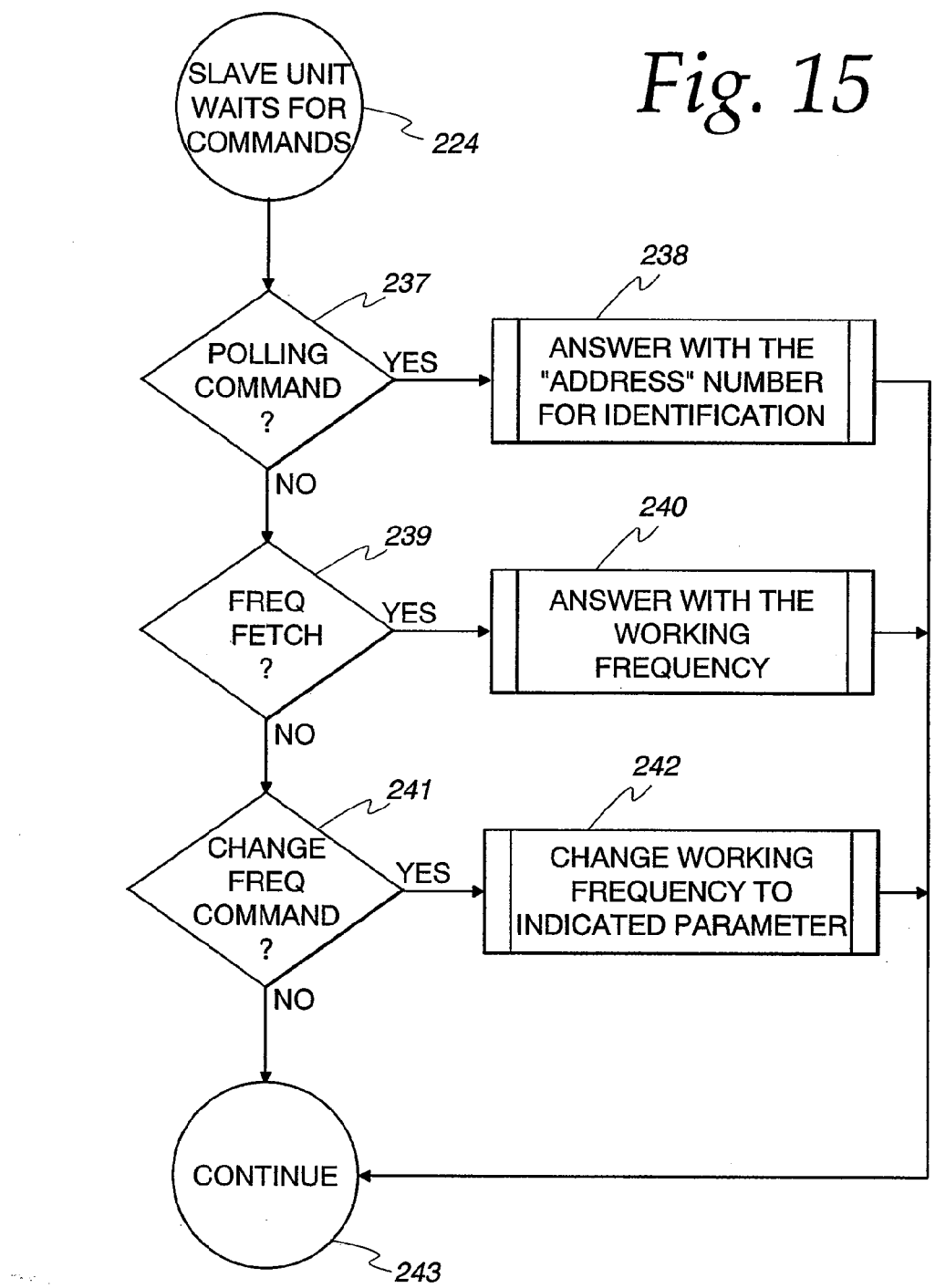

FIGS. 13, 14, and 15 provide a more detailed depiction of one embodiment of the functioning of the system, which is generally depicted in FIG. 12. In the first operational phase of the system, as depicted in FIG. 13, each unit when installed, and activated will determine their position to 211, the modular unit at address or position 1, would switch to frequency A 213, and be set as the master unit 214. The unit at position 1 would then proceed to read its actual frequency 215. The unit at position 2 would switch to frequency B 217 and be set as slave unit 218. The unit at position 2 would then determine its operational frequency 215. Likewise the unit at address 3 219 would switch to frequency C 220 and be set as slave unit 221. The unit at position 3 would then read its actual working frequency 215. If some problem or error occurred during this process, the system would then be prompted to return to the original read address 211 and proceed through the steps set out at 212-221 until it is done error free. Upon each unit's determining its working frequency 215, it will then, based on its status 223, either go a dormant state if it's a slave unit 224, and wait for commands, or if it's the master unit start the master process 225.

FIG. 14 is a flowchart of the operation performed by the designated master loop detector unit to determine if there is a conflict between the operational frequencies. The first step in this process is a determination as to how many loop detectors are in the system by a single polling interrogation cycle 226. The master unit then interrogates every existing loop detector and obtains their working frequency 227. The master unit then compares the working frequency of each 228. The master unit then determines if there are two or more loop detectors operating at the same working frequency 229. If the master unit determines that none of the units have the same working frequency it will conclude the system is fully functional, and ready to start the detection process 230. However, if the master unit determines that there is a conflict in the working frequencies and that a change is necessary 231, it will then have to run the appropriate subroutine to resolve these conflicts.

FIG. 15 provides the subroutine that will run when the master unit determines a conflict exists. At the start of this process each slave unit is waiting for commands 224. The master unit then sends a polling command 237. The slave unit that answers with address number of identification, the master unit then makes a request for the frequency that the stave unit is operating at 239, where upon the slave unit provide that information 240. Finally, if the master unit determines that a change of working frequency must be made to avoid cross talk, it will send in a signal 241. By sending a signal to the slave unit to change its oscillatory frequency by an indicated parameter 242 to thereby change its working frequency to avoid problems. Once completed the master instructs the system continue 243 and to start the process of detection 230 (FIG. 14).

The preceding describes the overall functioning of a loop detection system. Details on the controller circuit board, circuitry of the individual loop detector circuits is not provided unless necessary for an understanding of the invention. A detailed description of gate or security barrier controller board and loop detector circuits is not provided since they are well known in the art. Those skilled in the art once they have reviewed and understand how the system of the present invention operates will be able to practice it without undo experimentation.

While the invention has been particularly shown and described with reference to a preferred embodiment thereof, it will be understood by those skilled in the art that various changes in form and detail may be made to it without departing from the spirit and scope of the invention.

We claim:

1. A system for eliminating cross talk between loop detectors in a security system, said system comprising:

a) at least two inductive loops positioned adjacent to a movable barrier to detect the presence of objects adjacent to the barrier;
b) each of said at least two inductive Loops being connected to a separate loop detector circuit to thereby form at least two loop detectors;
c) a device for automatically selecting a unique frequency each of said at least two loop detectors will function at so each of said two loop detectors will be functioning at a different frequency to thereby avoid cross talk between each of said at least two loop detectors; and
wherein each loop detector is housed in a modular casing and said modular casing plugs into a loop detector modular unit receiving slot, at least two of said slots being positioned in an operative integrated fashion on a security system controller board, and wherein said device to select said unique frequency at which each of said at least two loop detectors will function comprises circuitry connected to each receiving slot that each of said at least two loop detectors will be connected to that automatically sets a unique and different frequency at which each of said at least two loop detectors will function.

2. A system for eliminating cross talk between loop detectors in a security system, said system comprising:

a) at least two inductive loops positioned adjacent to a movable barrier to detect the presence of objects adjacent to the barrier;
b) each of said at least two inductive Loops being connected to a separate loop detector circuit to thereby form at least two loop detectors;
c) a device for automatically selecting a unique frequency each of said at least two loop detectors will function at so each of said two loop detectors will be functioning at a different frequency to thereby avoid cross talk between each of said at least two loop detectors; and
wherein said device to select said unique frequency at which each of said at least two loop detectors will function comprises a CPU operatively connected to said at least two loop detectors that can sense the frequency at which each of said two loop detectors are functioning and if said at least two loop detectors are functioning at a frequency that would create cross talk among each of said two loop detectors said CPU will change the frequency that each of said at least two loop detectors are functioning at to thereby avoid cross talk among each of said two loop detectors.

3. A system for eliminating cross talk between loop detectors in a security system, said system comprising:

a) at least two inductive loops positioned adjacent to a movable barrier to detect the presence of objects adjacent to the barrier;
b) each of said at least two inductive Loops being connected to a separate loop detector circuit to thereby form at least two loop detectors;
c) a device for automatically selecting a unique frequency each of said at least two loop detectors will function at so each of said two loop detectors will be functioning at a different frequency to thereby avoid cross talk between each of said at least two loop detectors; and
wherein said device to select said unique frequency at which each of said at least two loop detectors will function comprises establishment of a communicative link by a control unit with said at least two loop detectors upon installation of said at least two loop detectors at an operational location and setting said frequency at which each of said at least two loop detectors will function so that the frequency of each are at different frequencies to thereby avoid cross talk.

4. A system for eliminating cross talk between loop detectors in a security system, said system comprising:
   a) at least two inductive loops positioned adjacent to a movable barrier to detect the presence of objects adjacent to the barrier;
   b) each of said at least two inductive Loops being connected to a separate loop detector circuit to thereby form at least two loop detectors;
   c) a device for automatically selecting a unique frequency each of said at least two loop detectors will function at so each of said two loop detectors will be functioning at a different frequency to thereby avoid cross talk between each of said at least two loop detectors; and
   wherein said device to select said unique frequency at which each of said two loop detectors will function comprises assigning unique addresses at which each loop detector circuit connects to a gate controller, and detection by said loop detector circuit of said address when said loop detection circuit is connected to said inductive loop at said controller board.

5. A system for eliminating cross talk between loop detectors in a security system, said system comprising:
   a) at least two inductive loops positioned adjacent to a movable barrier to detect the presence of objects adjacent to the barrier;
   b) each of said at least two inductive Loops being connected to a separate loop detector circuit to thereby form at least two loop detectors;
   c) a device for automatically selecting a unique frequency each of said at least two loop detectors will function at so each of said two loop detectors will be functioning at a different frequency to thereby avoid cross talk between each of said at least two loop detectors; and
   wherein each loop detector circuit is housed in a modular casing and said modular casing plugs into a loop detector modular unit receiving slot, at least two of said modular receiving slots being positioned in an operative integrated fashion on a security system controller board, and wherein said device to select said unique frequency at which each of said at least two loop detectors will function comprises an address designating device located in each receiving slot that each of said at least two loop detectors will be connected to that automatically sets a unique frequency at which each of said at least two loop detectors will function.

6. The system of claim 5 wherein said address designating device is a uniquely shaped mechanical apparatus that mates with said address designating device on said modular casing and sets a unique pre-designated frequency.

7. The system of claim 5 wherein said address designating device are one or more electrical contacts that connect to circuitry in said modular casing to thereby set a unique pre-designated frequency.

8. A method for eliminating cross talk between loop detector circuits in a security system, comprising the steps of:
   a.) powering up at least two loop detector circuits, each of two said loop detector circuits being connected to a unique inductive loop to form a loop detector in the security system;
   b.) determining a frequency at which each of said at least two loop detectors are functioning, the determining further comprising the steps of:
      i.) designating one of said at least two loop detector circuits as a master unit;
      ii.) having said master unit determine an operational frequency of said at least two loop detector circuits; and
      iii.) assigning a different operational frequency to each of said at least two loop detectors; and
   c.) assigning automatically different operational frequencies to each of said at least two loop detectors.

* * * * *